(12) United States Patent
Chuang (10) Patent No.: US 7,654,550 B2
(45) Date of Patent: *Feb. 2, 2010

(54) APPARATUS FOR ATTACHING ACCESSORY TO BICYCLE

(76) Inventor: Louis Chuang, 8$^{th}$ Floor-4, No. 20, Ta Lon Road, Taichung (TW)

( * ) Notice: Subject to any disclaimer, the term of this patent is extended or adjusted under 35 U.S.C. 154(b) by 293 days.

This patent is subject to a terminal disclaimer.

(21) Appl. No.: 11/558,066

(22) Filed: Nov. 9, 2006

(65) Prior Publication Data

US 2008/0111344 A1    May 15, 2008

(51) Int. Cl.
*B62J 9/00* (2006.01)
*B62J 99/00* (2006.01)
(52) U.S. Cl. ............ 280/288.4; 224/427; 224/431
(58) Field of Classification Search ........... 224/412, 224/418, 419, 427, 441, 443, 447, 431; 403/9, 403/109.2, 300, 314, 320, 322.2, 359.1, 374.1, 403/374.2, 409.1, DIG. 4, 8; 280/288.4, 280/304.5
See application file for complete search history.

(56) References Cited

U.S. PATENT DOCUMENTS

| | | | | |
|---|---|---|---|---|
| 48,038 A * | 6/1865 | Barnard | ............... | 285/283 |
| 91,361 A * | 6/1869 | Oakman | ............... | 24/24 |
| 389,335 A * | 9/1888 | Spear | ............... | 403/328 |
| 553,614 A * | 1/1896 | Handloser | ............... | 224/442 |
| 582,070 A * | 5/1897 | Lester | ............... | 280/288.4 |
| 757,161 A * | 4/1904 | Walter | ............... | 403/321 |
| 1,533,619 A * | 4/1925 | Thompson | ............... | 403/328 |
| 2,538,919 A * | 1/1951 | Shaff | ............... | 403/328 |
| 2,588,901 A * | 3/1952 | Weikart | ............... | 403/292 |
| 2,639,160 A * | 5/1953 | Studebaker et al. | ............... | 280/495 |
| 2,672,351 A * | 3/1954 | Kane | ............... | 280/288.4 |
| 2,885,231 A * | 5/1959 | Smith | ............... | 403/327 |
| 3,103,375 A * | 9/1963 | McMullin | ............... | 403/300 |
| 3,383,123 A * | 5/1968 | Murray | ............... | 285/83 |
| 4,021,126 A * | 5/1977 | Deeter et al. | ............... | 403/9 |
| 4,042,305 A * | 8/1977 | Vincent | ............... | 403/14 |
| 4,047,821 A * | 9/1977 | Hoke et al. | ............... | 403/109.3 |
| 4,222,593 A * | 9/1980 | Lauffenburger | ............... | 285/85 |
| 4,266,703 A * | 5/1981 | Litz | ............... | 224/443 |
| 4,274,649 A * | 6/1981 | Vanderhorst et al. | ............... | 280/204 |
| 4,360,213 A * | 11/1982 | Rudwick et al. | ............... | 280/250.1 |
| 4,519,635 A * | 5/1985 | McMath | ............... | 285/93 |
| 4,618,171 A * | 10/1986 | Fahl | ............... | 285/93 |
| 4,761,092 A * | 8/1988 | Nakatani | ............... | 403/104 |
| 5,184,639 A * | 2/1993 | Lee | ............... | 135/28 |
| 5,255,993 A * | 10/1993 | Kovacs | ............... | 403/328 |
| 5,282,555 A * | 2/1994 | Muir et al. | ............... | 224/532 |
| 5,303,944 A * | 4/1994 | Kalmus | ............... | 280/288.4 |

(Continued)

FOREIGN PATENT DOCUMENTS

DE      4237864 A1 *    5/1994

*Primary Examiner*—Lesley D Morris
*Assistant Examiner*—Wesley Potter
(74) *Attorney, Agent, or Firm*—Alan Kamrath; Kamrath & Associates PA (57) ABSTRACT

An apparatus for attaching an accessory to a bicycle includes a plug, a socket and a quick release. The plug is attached to the bicycle or the accessory. The socket is attached to the remaining one of the bicycle and the accessory. The socket is used to receive the plug. The quick release is used to retain the plug in the socket.

13 Claims, 14 Drawing Sheets

U.S. PATENT DOCUMENTS

| | | | |
|---|---|---|---|
| 5,332,134 A * | 7/1994 | Chen | 224/422 |
| 5,395,016 A * | 3/1995 | Minoura | 224/425 |
| 5,593,196 A * | 1/1997 | Baum et al. | 294/19.1 |
| 5,845,830 A * | 12/1998 | Dreiling | 224/415 |
| 5,887,943 A * | 3/1999 | Lee | 297/215.12 |
| 5,913,634 A * | 6/1999 | Heilig | 403/374.1 |
| 5,931,361 A * | 8/1999 | Schwimmer | 224/453 |
| 6,036,215 A * | 3/2000 | Bruner | 280/292 |
| 6,431,422 B1 * | 8/2002 | Moore et al. | 224/427 |
| 6,607,327 B1 | 8/2003 | Ho | |
| 6,712,376 B2 * | 3/2004 | Eberhardt et al. | 280/293 |
| 6,971,564 B2 * | 12/2005 | Yang | 224/425 |
| 7,216,410 B2 * | 5/2007 | Chuang | 29/428 |
| 7,273,221 B2 * | 9/2007 | Ockenden | 280/288.4 |
| 7,410,135 B1 * | 8/2008 | Dibble et al. | 248/220.21 |
| 2002/0096858 A1 * | 7/2002 | Shaw | 280/293 |
| 2004/0218974 A1 * | 11/2004 | Klar | 403/374.1 |
| 2005/0011921 A1 * | 1/2005 | Yang | 224/425 |
| 2006/0196322 A1 * | 9/2006 | Chuang | 81/177.85 |
| 2007/0090140 A1 * | 4/2007 | Chuang | 224/427 |
| 2007/0108244 A1 * | 5/2007 | Chuang | 224/420 |

* cited by examiner

APPARATUS FOR ATTACHING ACCESSORY TO BICYCLE

BACKGROUND OF INVENTION

1. Field of Invention

The present invention relates to a bicycle and, more particularly, to an apparatus for attaching an accessory to a bicycle.

2. Related Prior Art

There are various bags such as knapsacks, shoulder bags and hand bags. It is generally inconvenient and dangerous for a rider to carry a knapsack, a shoulder bag or a hand bag.

A rider may tie a bag to a luggage carrier of a bicycle. However, the rider might lose the bag while turning, since the bicycle is tilted, and the area of the luggage carrier is small. The rider has to pay attention to the bag tied to the luggage carrier while turning. This is a distracting and dangerous practice.

Disclosed in U.S. Pat. No. 6,607,327 is a conventional apparatus for carrying luggage on a bicycle. The conventional apparatus includes a bag 50 for containing the luggage, a fixing plate 10 secured to the bag 50, a clipping plate, a pin 40 for pivotally connecting the clipping plate to the fixing plate 10 and a spring 20 for closing the fixing plate 10 and the clipping plate. Thus, the fixing plate 10 and the clipping plate together form a clamp for clamping a rear rod 611 of a backseat 61 installed on the bicycle. As the bicycle is ridden, the bag 50 pivots about the rear rod 611. That is, the bag 50 rattles on the backseat 61. Hence, the fixing plate 10 and the clipping plate could be opened and disengaged from the rear rod 611 so that the bag 50 could be removed from the backseat 61.

Therefore, the present invention is intended to obviate or at least alleviate the problems encountered in the prior art.

SUMMARY OF INVENTION

According to the present invention, an apparatus is provided for attaching an accessory to a bicycle. The apparatus includes a plug, a socket and a quick release. The plug is attached to the bicycle or the accessory. The socket is attached to the remaining one of the bicycle and the accessory. The socket is used to receive the plug. The quick release is used to retain the plug in the socket.

An advantage of the apparatus according to the present invention is firm attaching of the accessory to the bicycle for using the quick release.

Another advantage of the apparatus according to the present invention is quick removing of the accessory from the bicycle by pivoting the quick release.

Other advantages and features of the present invention will be apparent from the following description referring to the drawings.

BRIEF DESCRIPTION OF DRAWINGS

The present invention will be described through detailed illustration of two embodiments referring to the drawings.

DETAILED DESCRIPTION OF EMBODIMENTS

Figure 1:
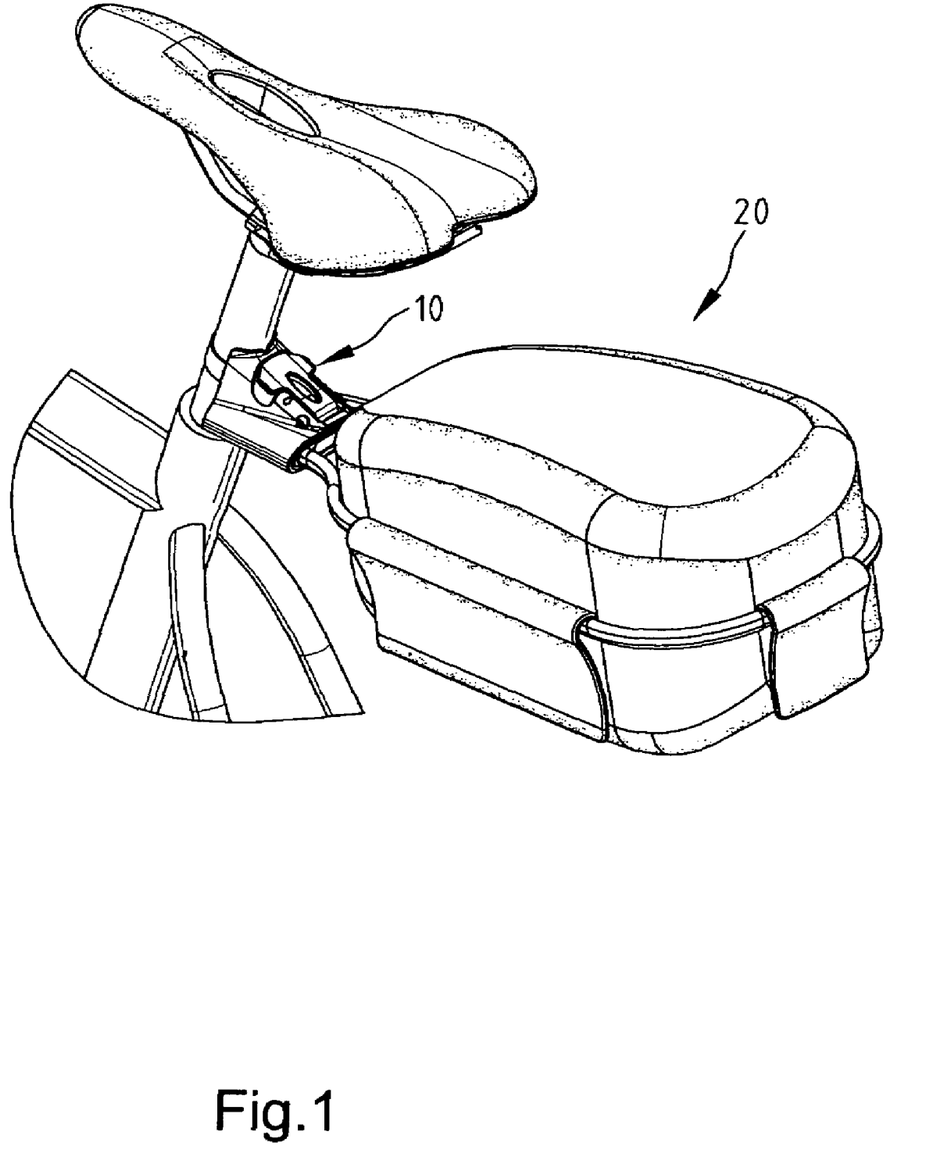
FIG. 1 is a partial perspective view of a bicycle equipped with an apparatus for attaching an accessory to the bicycle according to the first embodiment of the present invention.

Referring to FIGS. 1 though 9, according to a first embodiment of the present invention, an apparatus is provided for attaching an accessory to a bicycle. The accessory may be a case 22, 32 for containing luggage. The apparatus includes a carrier 20, 30 for carrying the case 22, 32 and a connector 10 for detachably attaching the carrier 20, 30 to the bicycle.

Referring to FIGS. 2 through 5, the connector 10 includes a ferrule 12 wound around and connected to a saddle post of the bicycle, a socket 11 connected to the ferrule 12 and a quick release 14 pivotally connected to the socket 11. The ferrule 12 defines a screw hole 121.

The socket 11 includes a closed end 111 and an open end 114 opposite to the closed end 111. The socket 11 defines a space 115, an upper aperture 118 in communication with the space 115 and a lower aperture 116 in communication with the space 115. The socket 11 includes two ears 112 formed on opposite sides of the upper aperture 118.

A fastener 13 is used to connect the socket 11 to the ferrule 12. The fastener 13 is preferably a threaded bolt driven into the screw hole 121 through the closed end 111.

The quick release 14 includes a cam 141 and a handle 144 extended from the cam 141. The cam 141 includes a lobe 142 and a flat portion 143 next to the lobe 142. The cam 141 can be inserted in the space 115 through the upper aperture 118. The cam 141 can be pivoted by operating the handle 144.

Another fastener 113 is used to pivotally connect the quick release 14 to the ears 112. The fastener 113 is preferably a pin.

The carrier 20 includes a frame 24, a plug 21 secured to the frame 24 and a positioning device 23 connected to the plug 21. The frame 24 is used for supporting the case 22. The plug 21 can be inserted into the socket 11. The positioning device 23 is used for positioning the plug 21 within the socket 11. The carrier 30 includes a plug 31 secured to the case 32. The plug 31 is adapted to be used for engagement with the socket 11 of the connector 10.

Figure 2:
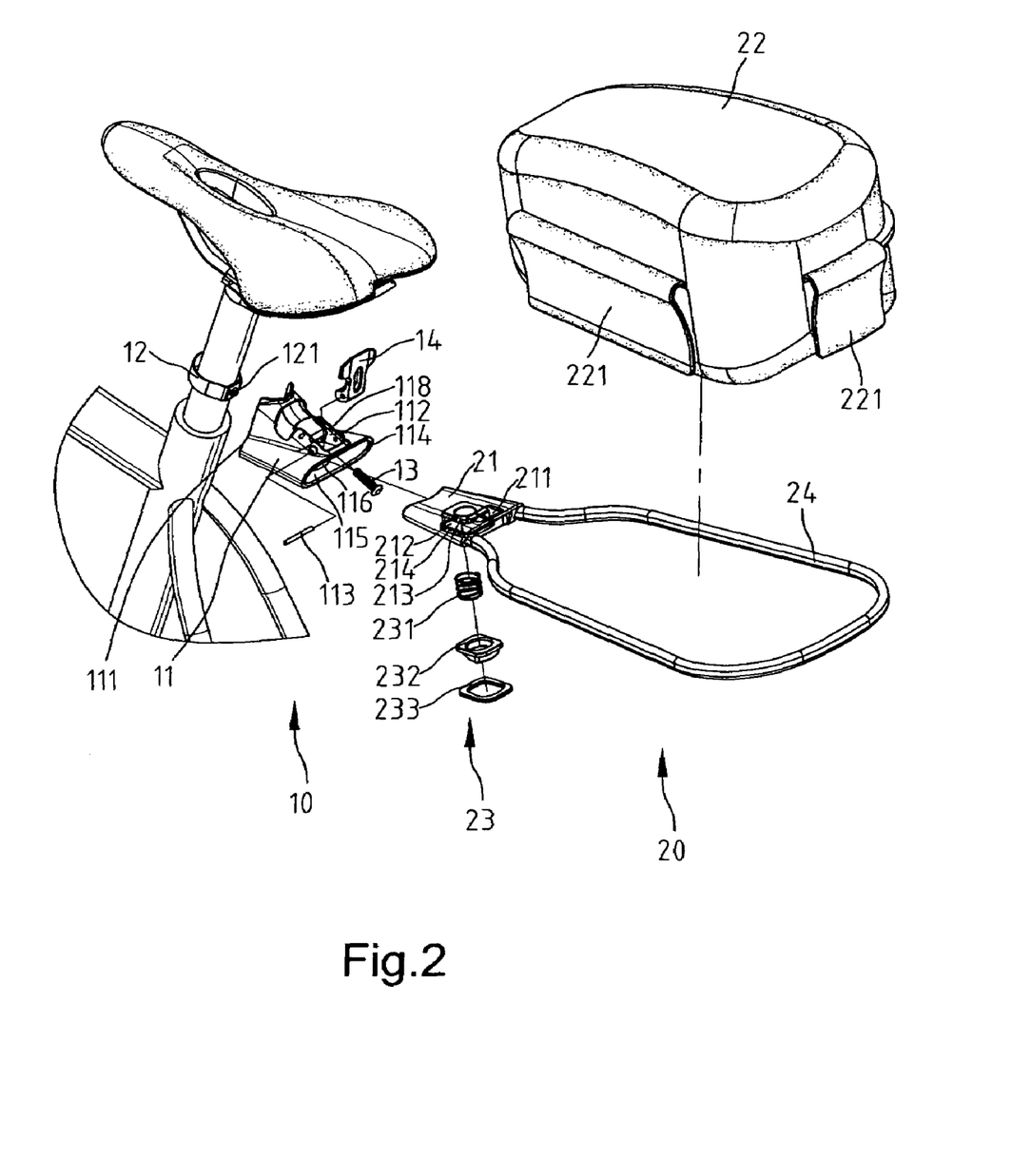
FIG. 2 is an exploded view of the apparatus shown in FIG. 1.
Figure 3:
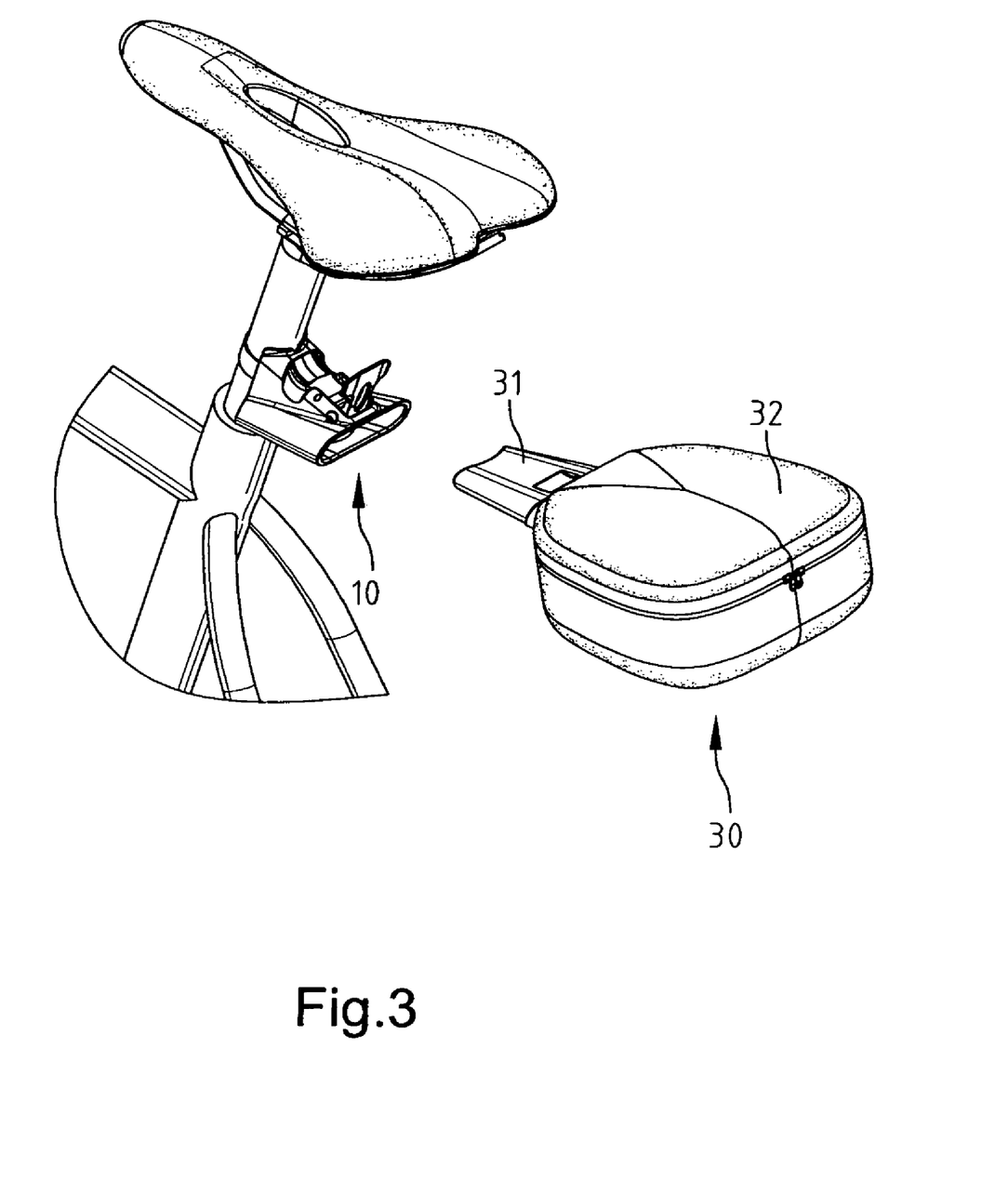
FIG. 3 is another exploded view of the apparatus shown in FIG. 2.
Figure 4:
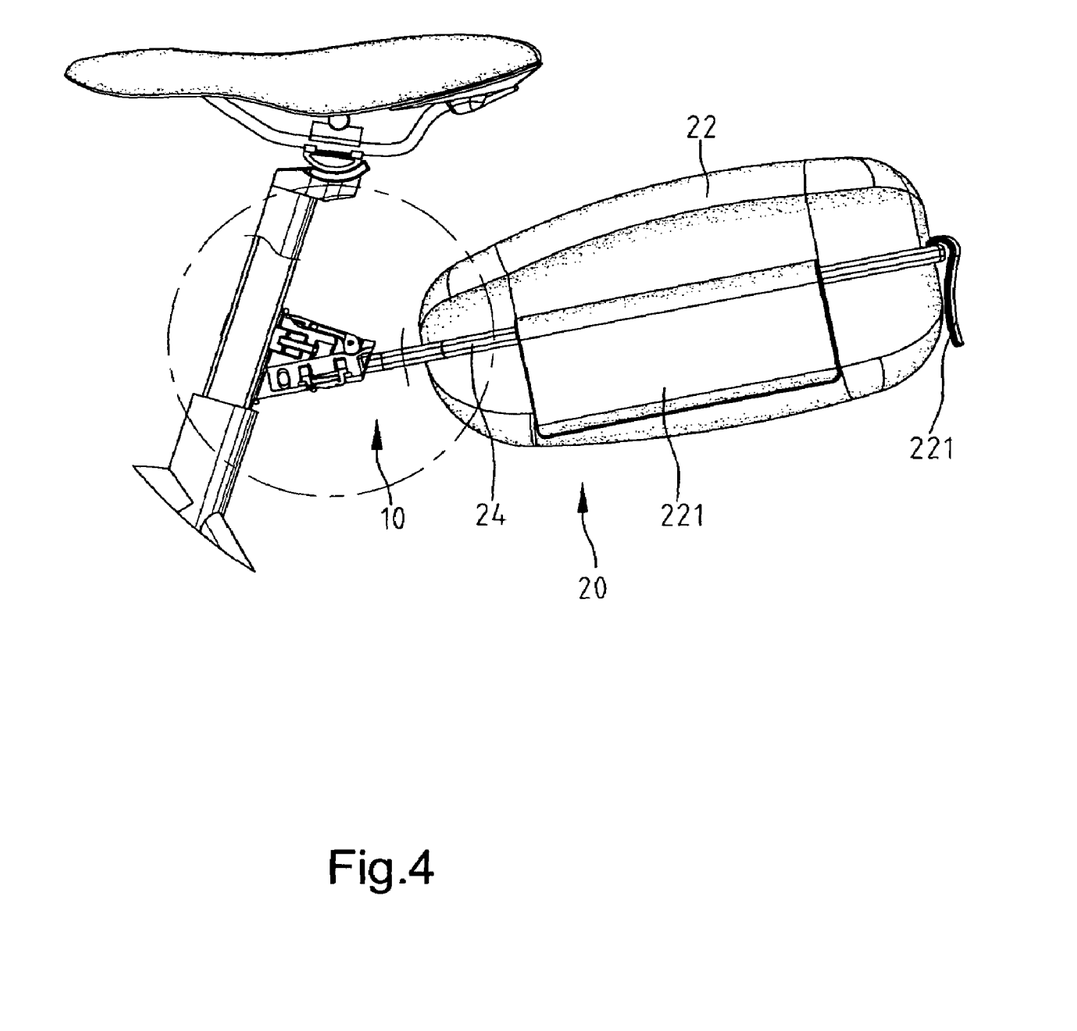
FIG. 4 is a side view of the apparatus shown in FIG. 1.

The case 22 includes a plurality of hooks 221 formed thereon. The hooks 221 are used to hook the frame 24 so that the case 22 is firmly mounted on the frame 24.

The plug 21 defines a recess 211 on an upper side, a cavity 212 on a lower side and a groove 214 around the cavity 212. A boss 213 is formed on the lower side of the plug 21 within the cavity 212.

The positioning device 23 includes an elastic element 231, a detent 232 and a restraint 233. The elastic element 231 is preferably a helical spring. The elastic element 231 includes an end provided around the boss 213. The detent 232 is like an inverted cap. That is, the detent 232 includes a concave upper side 2321 for receiving another end of the elastic element 231 and a convex lower side 2322 inserted through an aperture 2331 defined in the restraint 233 and an annular flange 2323 for abutment against the restraint. The restraint 233 is fit in the groove 214 for retaining the elastic element 231 and the detent 232 within the cavity 212. The convex lower side 2322 is formed with a slope 2324.

Figure 5:
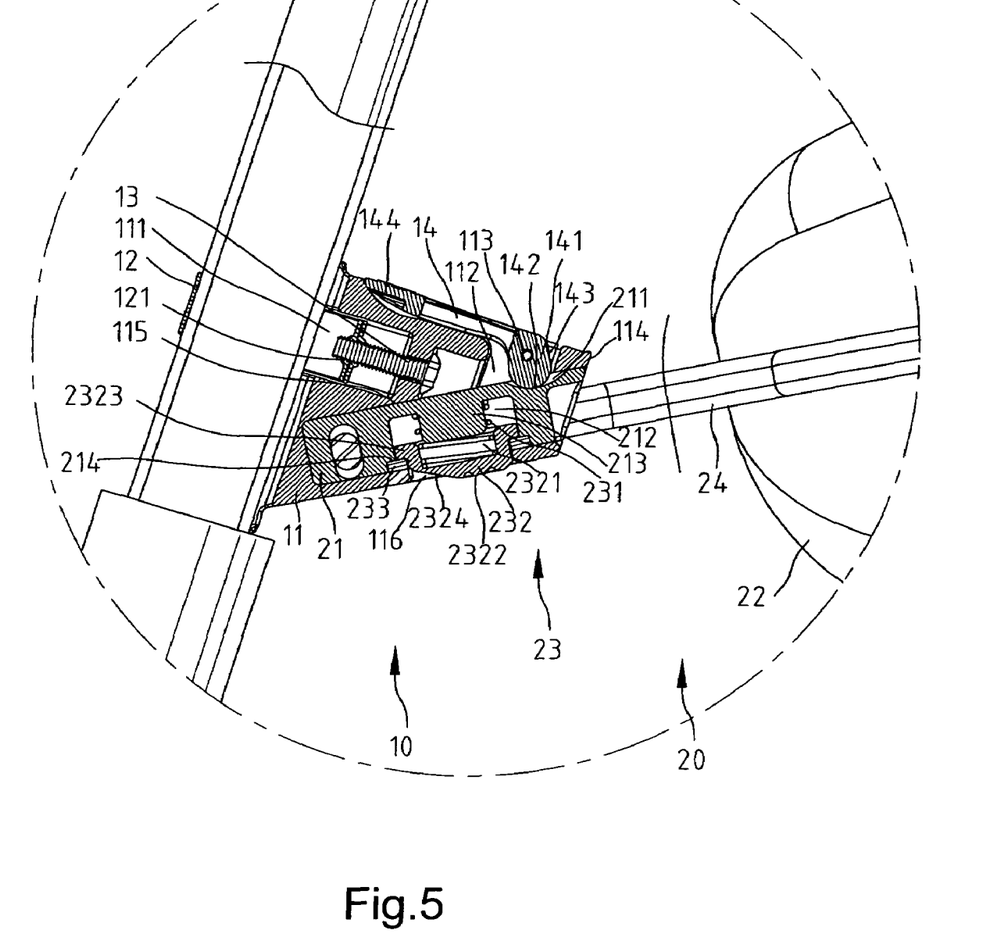
FIG. 5 is a cross-sectional view of the apparatus shown in FIG. 4.

Referring to FIG. 5, the detent 232 is inserted in the lower aperture 116 so that the plug 21 is positioned within the socket 11 by the positioning device 23. The lobe 142 is disposed in the recess 211 so that the plug 21 is retained within the socket 11.

Figure 6:
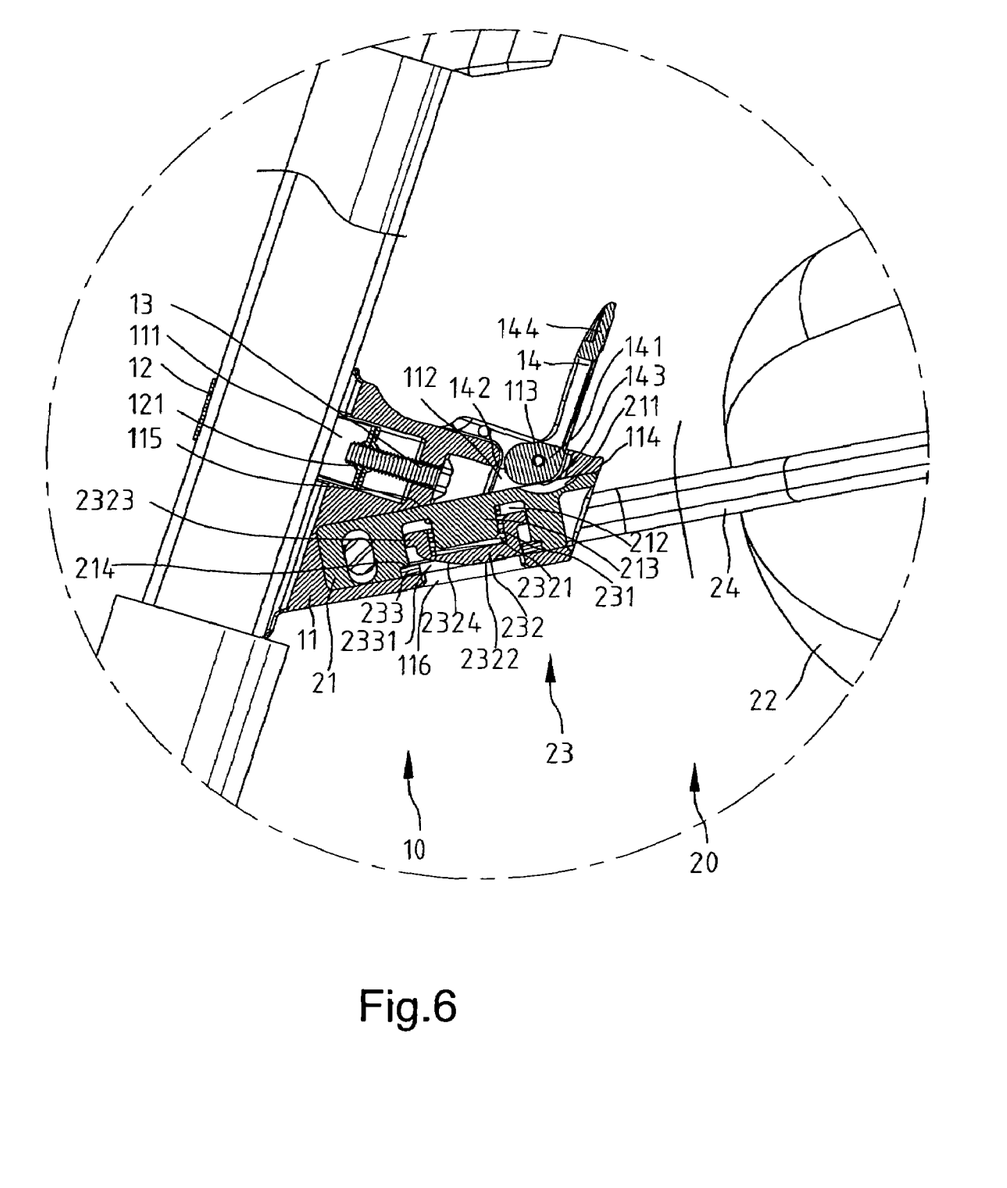
FIG. 6 is another cross-sectional view of the apparatus in another position than shown in FIG. 5.
Figure 7:
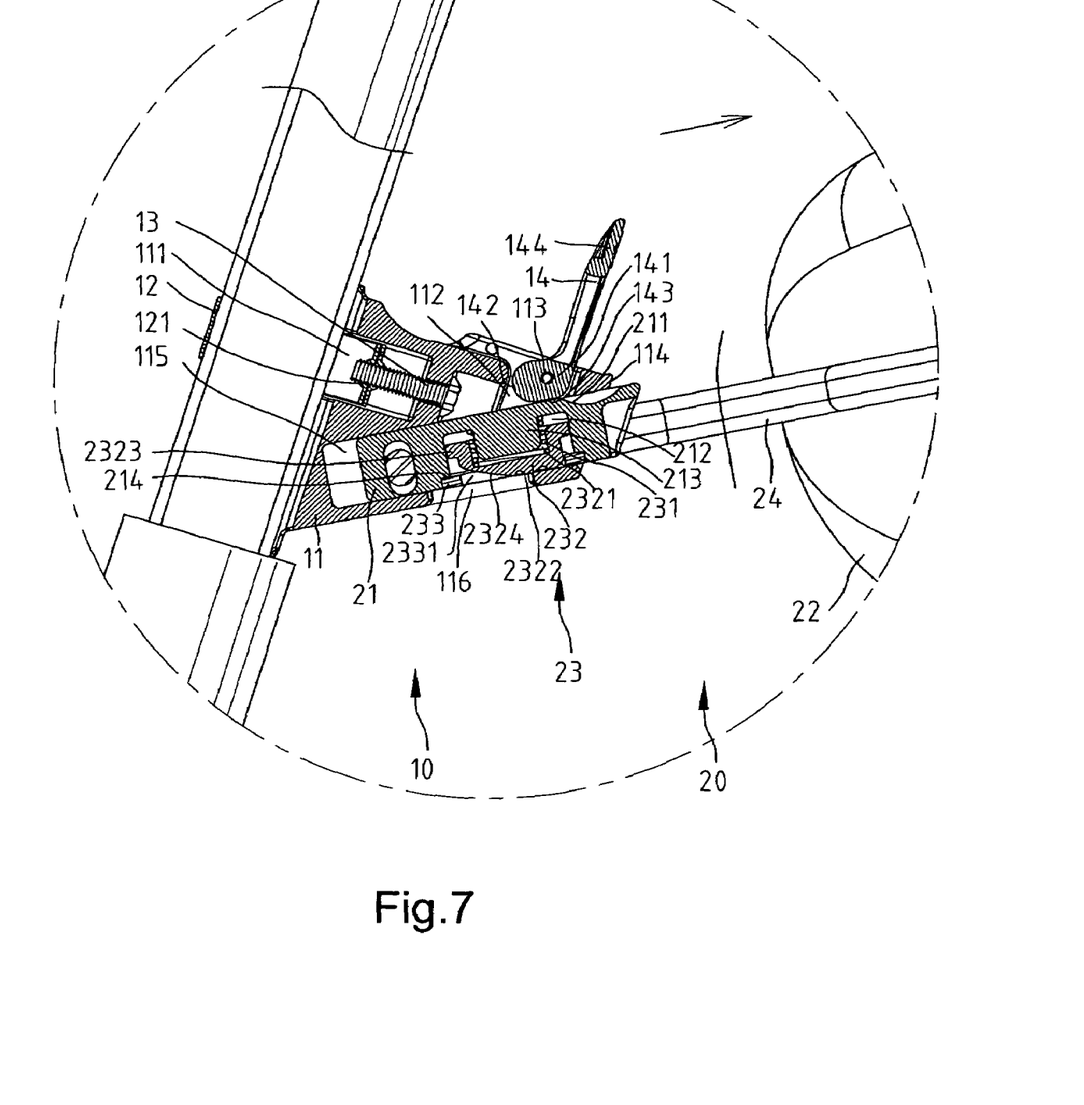
FIG. 7 is another cross-sectional view of the apparatus in another position than shown in FIG. 6.

Referring to FIGS. 6 and 7, the lobe 142 is removed from the recess 211, and the detent 232 is removed from the lower aperture 116. Hence, the plug 21 can be removed from the socket 11.

Figure 8:
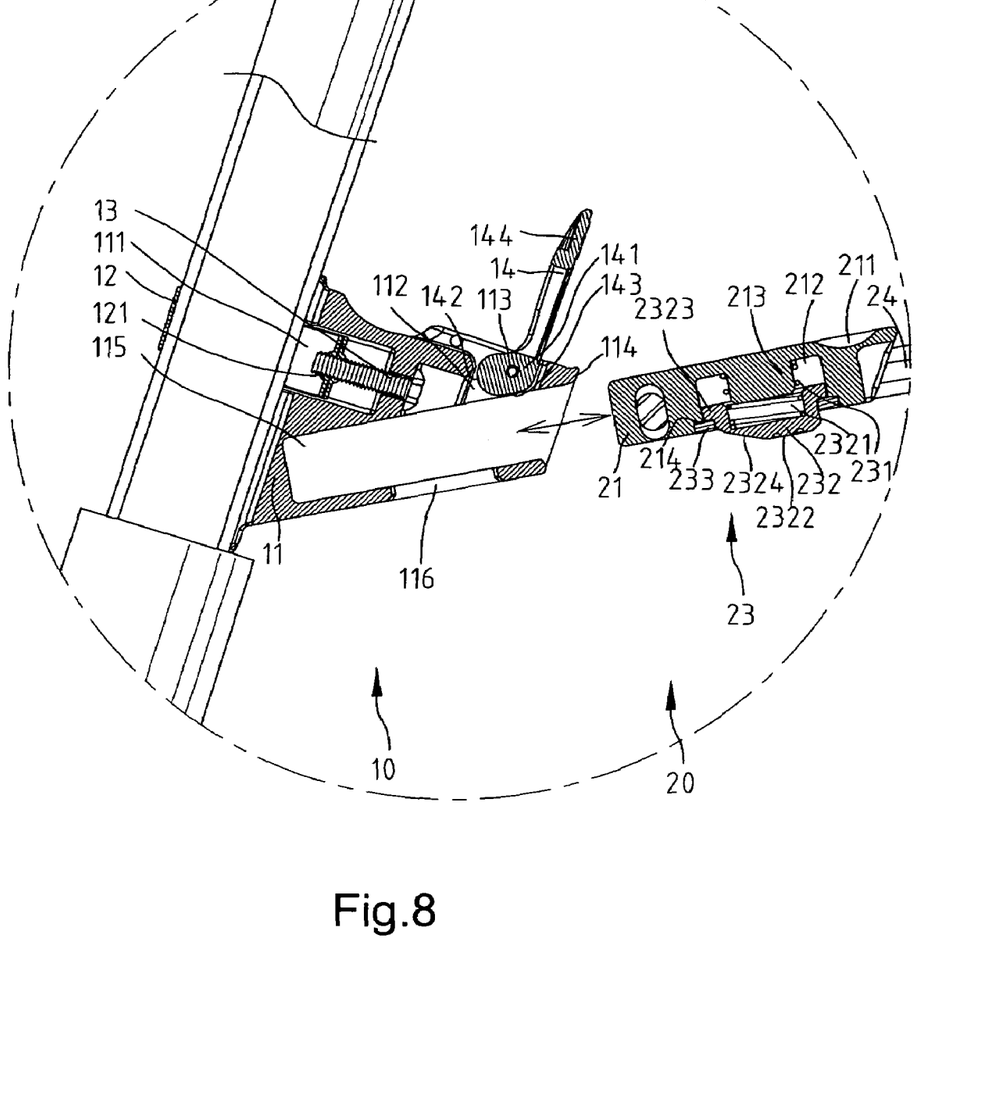
FIG. 8 is another cross-sectional view of the apparatus in another position than shown in FIG. 7.
Figure 9:
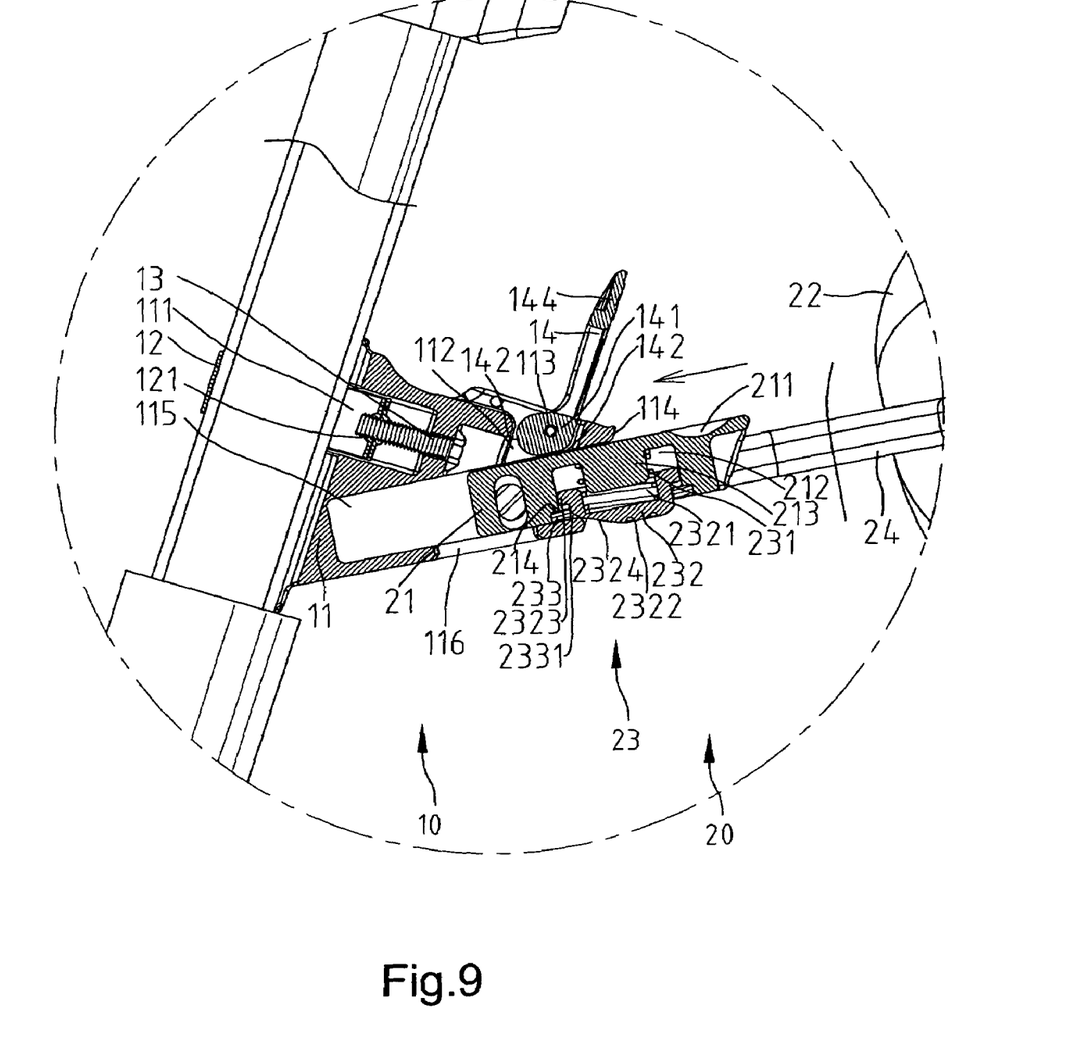
FIG. 9 is another cross-sectional view of the apparatus in another position than shown in FIG. 8.

Referring to FIGS. 8 and 9, the plug 21 can be inserted into the socket 11 again. The slope 2324 can slide on a portion of the socket 11, thus pushing the detent 232 so that the plug 21 can easily be inserted into the socket 11.

Figure 10:
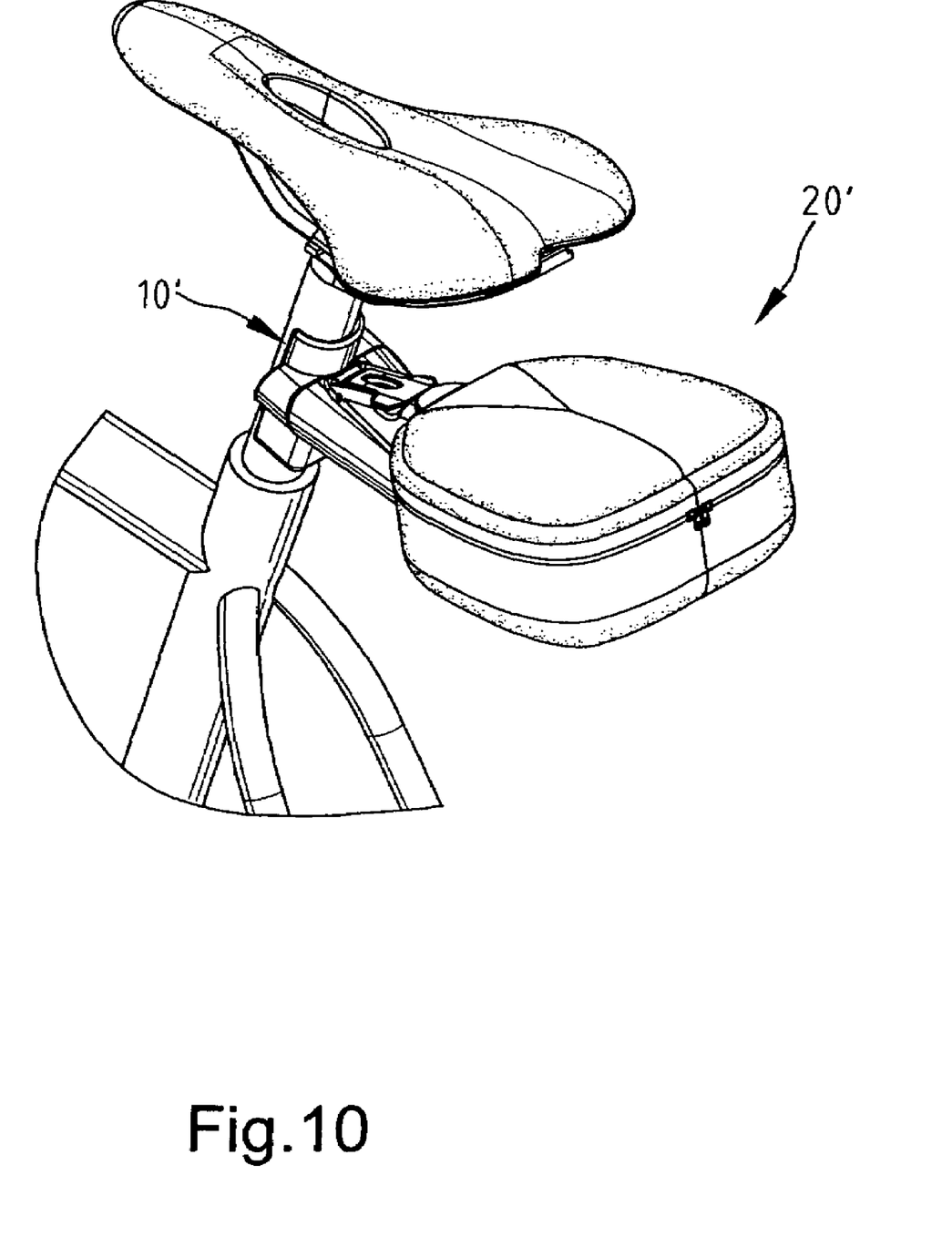
FIG. 10 is a partial perspective view of a bicycle equipped with an apparatus for attaching an accessory to the bicycle according to the second embodiment of the present invention.
Figure 11:
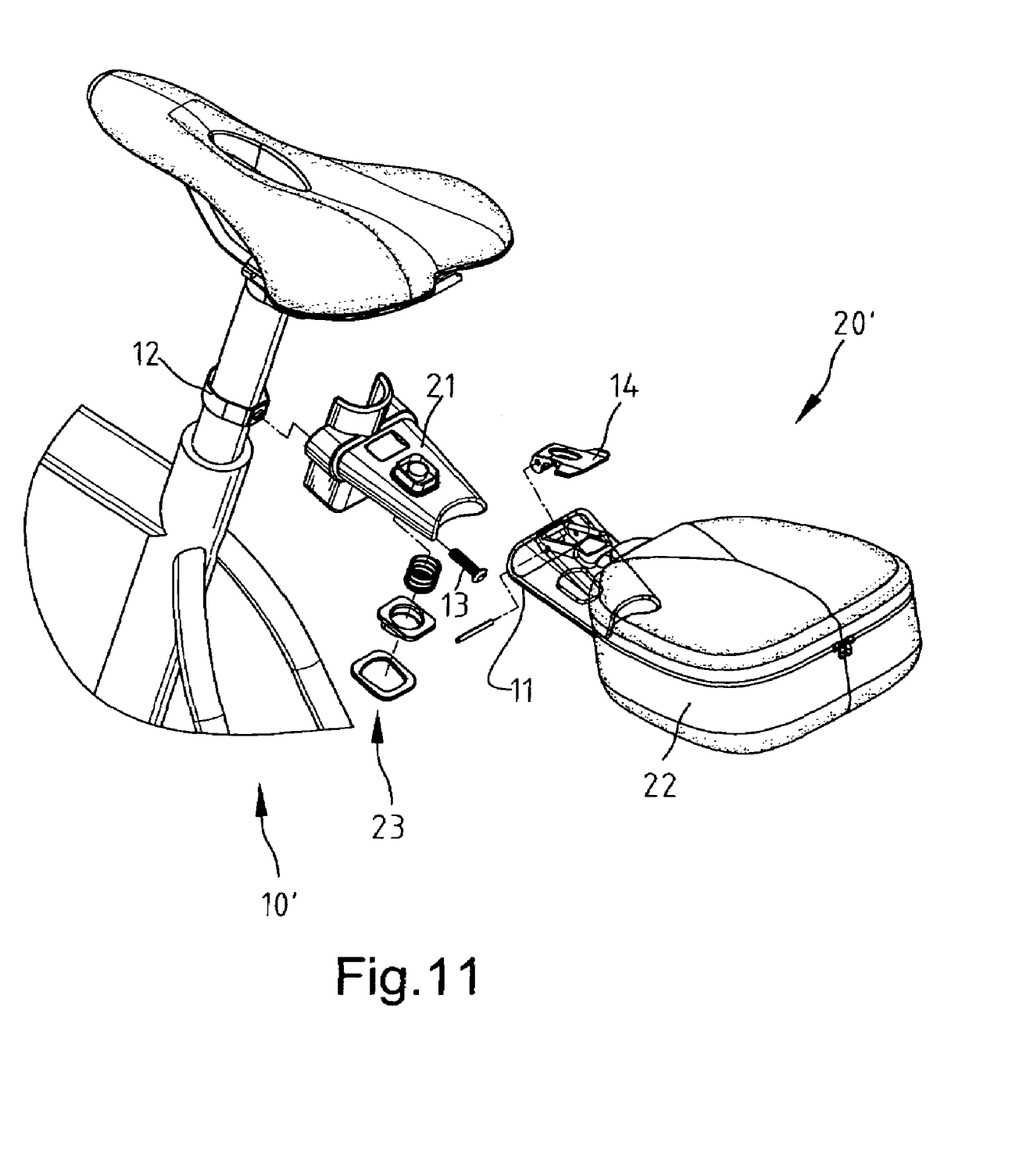
FIG. 11 is an exploded view of the apparatus shown in FIG. 10.

Referring to FIGS. 10 and 11, according to a second embodiment of the present invention, an apparatus is provided for attaching an accessory to a bicycle. The accessory may be the case 22. The apparatus includes a carrier 20' for carrying the case 22 and a connector 110' for detachably attaching the cater 20' to the bicycle. The connector 10' includes the ferrule 12 wound around and connected to the saddle post of the bicycle, the plug 21 secured to the ferrule 12 by the fastener 13 and the positioning device 23. The carrier 20' includes the socket 11 for receiving the plug 21 and the quick release 14 for retaining the plug 21 within the socket 11. The socket 11 is secured to the case 22 so that the frame 24 and the hooks 221 used in the first embodiment are omitted. The second embodiment is otherwise identical to the first embodiment and hence will not be further described in detail.

Figure 12:
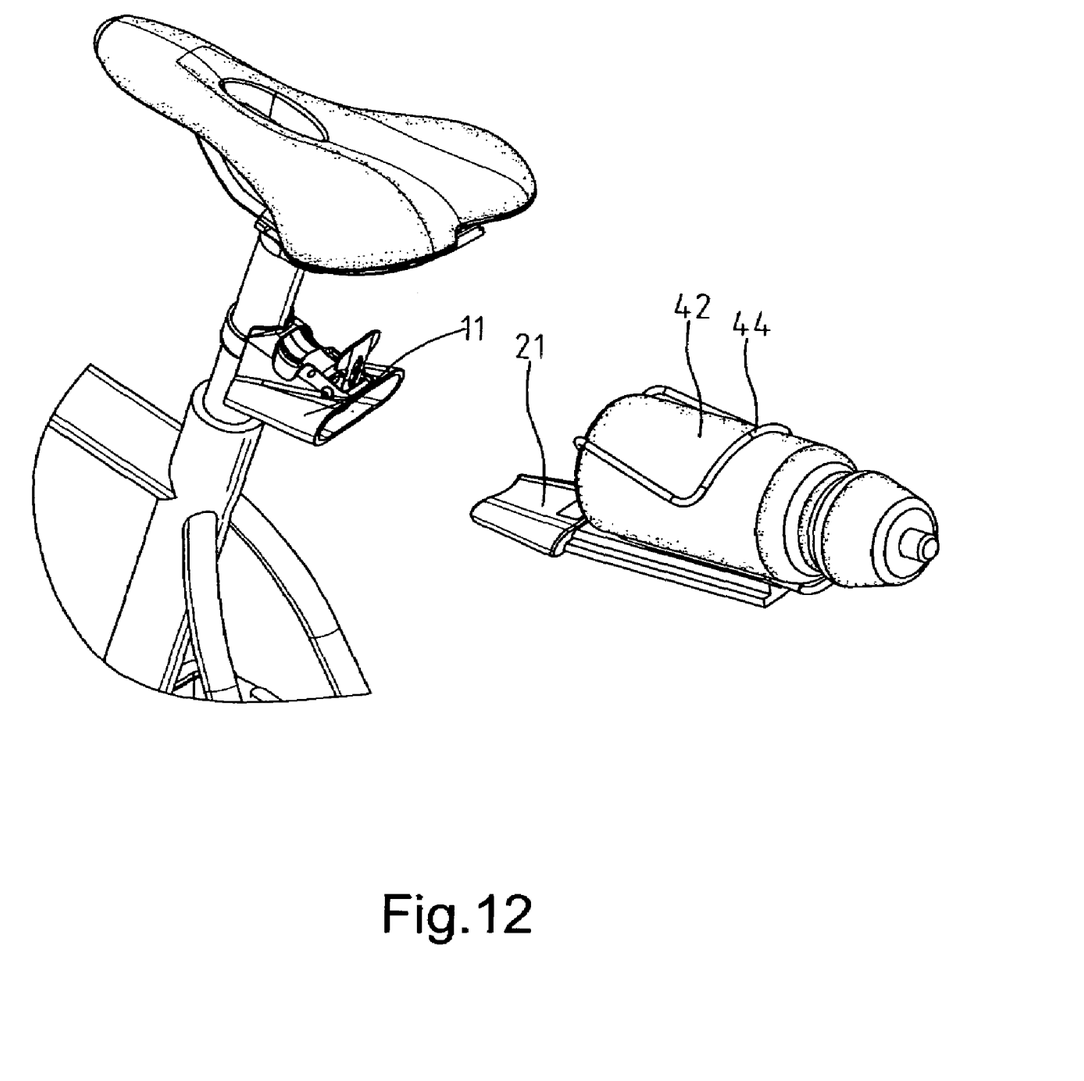
FIG. 12 is an exploded view of the apparatus shown in FIG. 1 for attaching a bottle holder to the bicycle.

Referring to FIG. 12, the accessory may be a holder 44 for holding a bottle 42.

Figure 13:
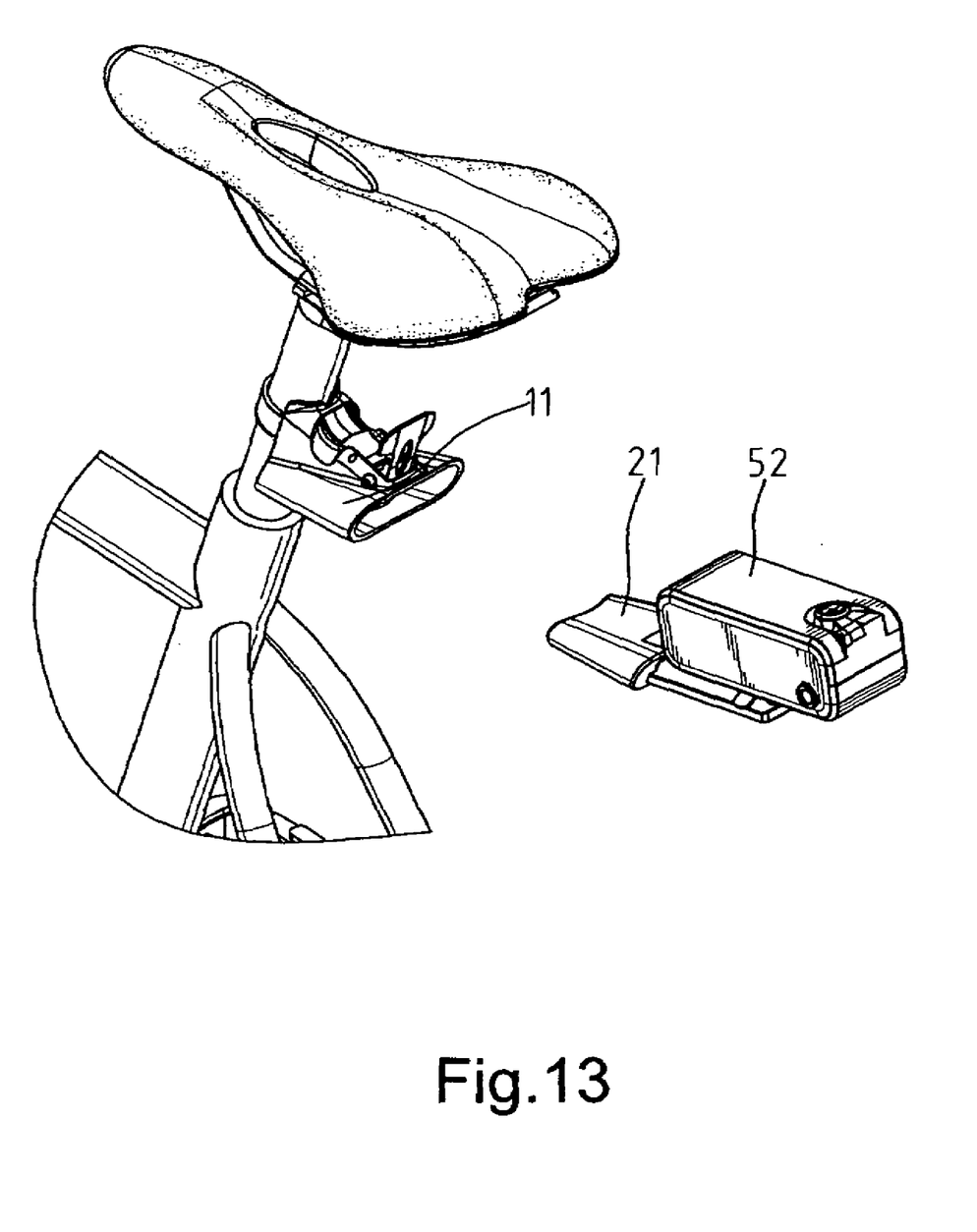
FIG. 13 is an exploded view of the apparatus shown in FIG. 1 for attaching a battery case to the bicycle.

Referring to FIG. 13, the accessory may be a holder case 52 for containing batteries.

Figure 14:
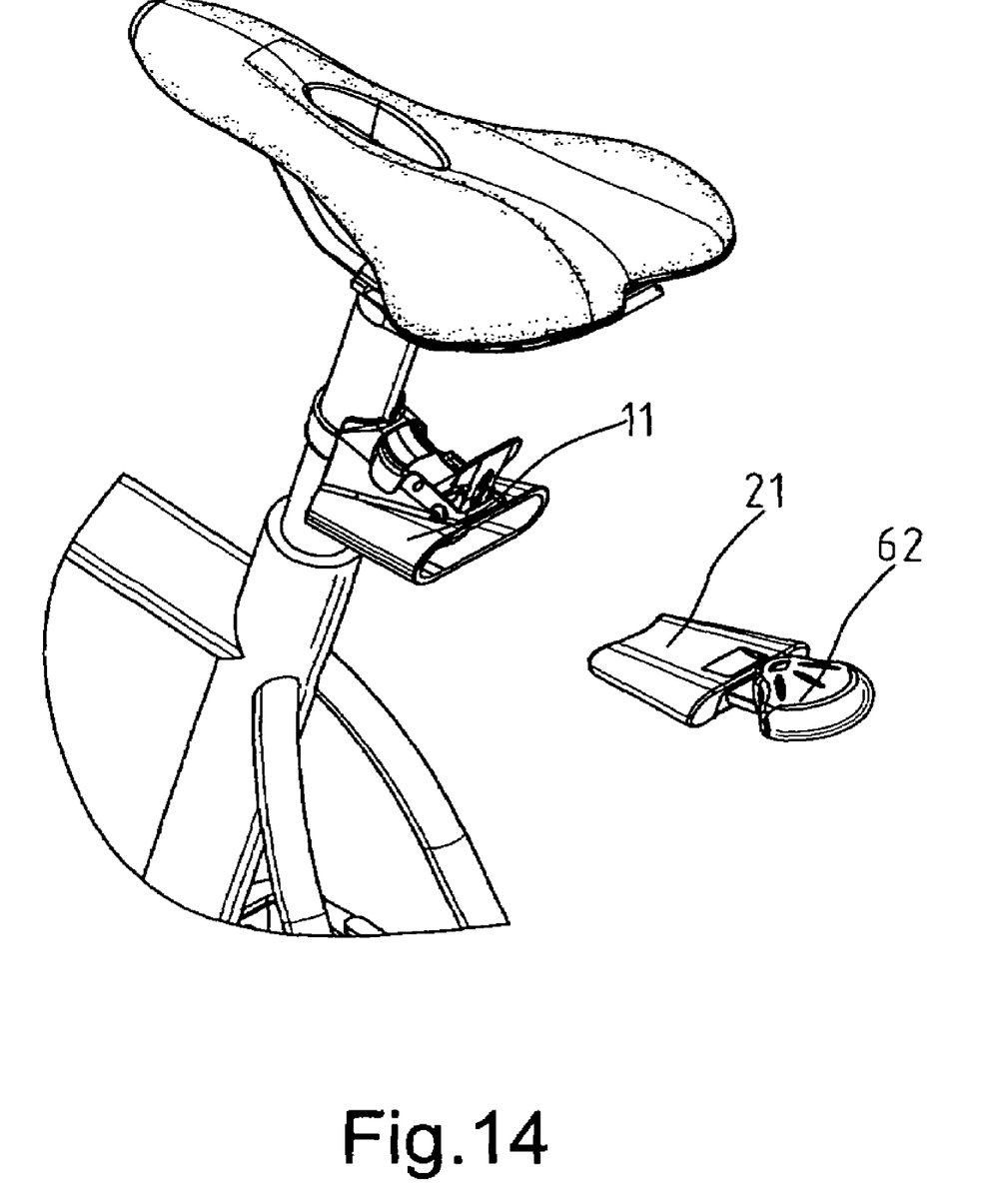
FIG. 14 is an exploded view of the apparatus shown in FIG. 1 for attaching a lamp to the bicycle.

Referring to FIG. 14, the accessory may be a lamp 62.

The apparatus according to the present invention exhibits several advantages. Firstly, the accessory is firmly attached to the bicycle for using both of the positioning device and the quick release. Secondly, the accessory can quickly be removed from the bicycle by pushing the positioning device and pivoting the quick release.

The present invention has been described through the illustration of the preferred embodiments. Those skilled in the art can derive variations from the preferred embodiments without departing from the scope of the present invention. Therefore, the preferred embodiments shall not limit the scope of the present invention defined in the claims.

What is claimed is:

1. An apparatus for attaching an accessory to a saddle post of a bicycle, the apparatus comprising:
   a plug attached to one of the saddle post of the bicycle and the accessory;
   a ferrule provided around the saddle post of the bicycle;
   a socket attached to the remaining one of the saddle post of the bicycle and the accessory, with the socket having a space with an open end, with the plug slideably and non rotatably received in the space through the open end, with the socket further including a first aperture spaced from the open end, wherein the socket further includes a second aperture in communication with the space and spaced from the first aperture, wherein the socket comprises two ears formed thereon;
   a fastener attaching one of the plug and the socket to the ferrule;
   a quick release on the socket and retaining the plug in the socket, wherein the quick release comprises:
      a cam pivotally connected to the two ears and formed with a lobe that can be inserted into the space through the second aperture and a flat portion next to the lobe; and
      a handle extended from the cam so that the handle is operable to pivot the cam, wherein the plug defines a recess receiving the lobe; and
   a positioning device connected to the plug for positioning the plug within the socket, with the positioning device being moveable relative to the plug between an insertion position and an engaged position, with the plug and the positioning device in the insertion position being of a size insertable into the space through the open end, with the positioning device in the engaged position located in the first aperture of the socket.

2. The apparatus according to claim 1 wherein the plug is attached to the accessory while the socket is attached to the bicycle.

3. The apparatus according to claim 1 wherein the plug is attached to the bicycle while the socket is attached to the accessory.

4. The apparatus according to claim 1 wherein the plug, with the positioning device in the engaged position and in the first aperture of the socket, is of a size larger than the open end.

5. The apparatus according to claim 4 wherein the positioning device comprises a detent.

6. The apparatus according to claim 5 wherein the positioning device comprises an elastic element biasing the detent.

7. The apparatus according to claim 6 wherein the plug defines a cavity receiving the elastic element.

8. The apparatus according to claim 7 wherein the elastic element is a helical spring, and the plug comprises a boss formed within the cavity and inserted in the helical spring.

9. The apparatus according to claim 7 wherein the positioning device comprises a restraint retaining the detent within the cavity.

10. The apparatus according to claim 9 wherein the plug defines a groove around and in communication with the cavity, and the restraint is fit in the groove.

11. The apparatus according to claim 10 wherein the restraint defines an aperture through which the detent can be inserted.

12. The apparatus according to claim 6 wherein the detent comprises a concave side receiving the elastic element and a convex side for insertion through the first aperture.

13. The apparatus according to claim 12 wherein the detent comprises a slope formed on the convex side for sliding on a portion of the socket so that the detent is pushed from the engaged position to the insertion position for allowing the further insertion of the plug into the socket.

* * * * *